(12) United States Patent
Downes et al.

(10) Patent No.: US 9,879,705 B2
(45) Date of Patent: Jan. 30, 2018

(54) ELECTRONIC DEVICE CADDY

(71) Applicant: Delta Cycle Corporation, Randolph, MA (US)

(72) Inventors: Michael Downes, Coronado, CA (US); Errol Drew, Cape Town (ZA)

(73) Assignee: Delta Cycle Corporation, Randolph, MA (US)

( * ) Notice: Subject to any disclaimer, the term of this patent is extended or adjusted under 35 U.S.C. 154(b) by 628 days.

(21) Appl. No.: 14/224,323

(22) Filed: Mar. 25, 2014

(65) Prior Publication Data

US 2015/0282343 A1    Oct. 1, 2015

(51) Int. Cl.
| | |
|---|---|
| *H05K 5/02* | (2006.01) |
| *F16B 2/12* | (2006.01) |
| *F16B 2/18* | (2006.01) |
| *F16M 11/04* | (2006.01) |
| *F16M 11/10* | (2006.01) |
| *F16M 13/00* | (2006.01) |

(52) U.S. Cl.
CPC .................. *F16B 2/12* (2013.01); *F16B 2/18* (2013.01); *F16B 2/185* (2013.01); *F16M 11/041* (2013.01); *F16M 11/10* (2013.01); *F16M 13/00* (2013.01)

(58) Field of Classification Search
CPC ...... F16M 11/10; F16M 13/00; F16M 11/041; F16M 13/02; F16M 2200/022; H04M 1/04; A45F 2200/0516; H05K 5/0204; B60R 11/0258; B60R 2011/0059; B60R 2011/0071; B60R 2011/0078; B60R 11/0241; F16B 2/18; F16B 2/12; F16B 2/185; H04B 1/3877; B62J 9/005; G10K 11/08

USPC ........................................................ 224/420
See application file for complete search history.

(56) References Cited

U.S. PATENT DOCUMENTS

| | | | |
|---|---|---|---|
| 5,127,562 | A | 7/1992 | Zane et al. |
| 5,226,341 | A | 7/1993 | Shores |
| 5,276,596 | A | 1/1994 | Krenzel |
| 5,395,018 | A | 3/1995 | Studdiford |

(Continued)

FOREIGN PATENT DOCUMENTS

| | | |
|---|---|---|
| CN | 1647986 A | 8/2005 |
| CN | 203142867 | 8/2013 |

(Continued)

OTHER PUBLICATIONS

Delta Cycle Corp Smartphone Mount for Bikes, by Delta Cycle, http://www.amazon.com/Delta-Cycle-Smartphone-Mount-Bikes/sim/B0050TCKUE/2, 1996-2014, five (5) pages.

(Continued)

*Primary Examiner* — Nathan J Newhouse
*Assistant Examiner* — Matthew Theis
(74) *Attorney, Agent, or Firm* — Iandiorio Teska & Coleman, LLP (57) ABSTRACT

An electronic device caddy includes a first tray portion with at least two spaced lengthwise channels and an end cage and a second tray portion also including an end cage and at least two lengthwise rails slideable in the spaced channels of the first tray portion to load and accommodate different size electronic devices between the end cages. A locking mechanism releasably locks at least one rail in its channel. A mounting bracket is attached rearward of one tray portion.

17 Claims, 7 Drawing Sheets

(56) References Cited

U.S. PATENT DOCUMENTS

| | | | |
|---|---|---|---|
| 5,797,613 A | 8/1998 | Busby | |
| 5,903,645 A | 5/1999 | Tsay | |
| 5,947,499 A | 9/1999 | Busby | |
| 6,092,823 A | 7/2000 | Busby | |
| 6,543,957 B1 | 4/2003 | Raspotnig | |
| 6,719,254 B1 | 4/2004 | Speiser | |
| 6,843,456 B1 | 1/2005 | Hajianpour | |
| 6,888,940 B1 | 5/2005 | Deppen | |
| 7,000,811 B2 | 2/2006 | Gilstrap et al. | |
| 7,077,302 B2 | 7/2006 | Chuang | |
| 7,123,450 B1 | 10/2006 | Villiard | |
| 8,469,248 B2 | 6/2013 | Weng et al. | |
| 8,733,721 B2 | 5/2014 | Lacerte et al. | |
| 8,752,800 B2 | 6/2014 | Lacerte et al. | |
| 8,960,364 B2 | 2/2015 | Le Gette et al. | |
| 8,998,048 B1 | 4/2015 | Wu | |
| 2002/0113185 A1 | 8/2002 | Ziegler | |
| 2003/0233736 A1 | 12/2003 | Faerber et al. | |
| 2005/0045681 A1 | 3/2005 | Hancock et al. | |
| 2007/0221694 A1 | 9/2007 | Aguiliar et al. | |
| 2009/0173858 A1 | 7/2009 | LaCerte et al. | |
| 2009/0212189 A1* | 8/2009 | Carnevali | B25B 5/02 248/346.04 |
| 2010/0248897 A1 | 9/2010 | Hsiao et al. | |
| 2010/0264182 A1* | 10/2010 | Perlman | H04M 1/04 224/409 |
| 2011/0062199 A1 | 3/2011 | Liu | |
| 2012/0018595 A1* | 1/2012 | Berry | A45F 5/021 248/121 |
| 2012/0024619 A1 | 2/2012 | Lin | |
| 2012/0061537 A1 | 3/2012 | LaCerte et al. | |
| 2012/0199501 A1 | 8/2012 | Le Gette et al. | |
| 2012/0241572 A1 | 9/2012 | McClain et al. | |
| 2013/0181101 A1* | 7/2013 | Avganim | F16M 13/02 248/205.1 |
| 2013/0193174 A1* | 8/2013 | Ackeret | F16M 11/105 224/275 |
| 2013/0214019 A1 | 8/2013 | Wu | |
| 2013/0248569 A1 | 9/2013 | Hsu | |
| 2013/0279098 A1 | 10/2013 | Cho | |
| 2014/0042285 A1* | 2/2014 | Carnevali | B60R 11/02 248/316.4 |
| 2014/0191099 A1 | 7/2014 | Schwarz | |
| 2014/0221055 A1 | 8/2014 | Wu | |
| 2014/0346202 A1 | 11/2014 | McClain et al. | |
| 2015/0129729 A1 | 5/2015 | La Certe et al. | |
| 2015/0163936 A1 | 6/2015 | Le Gette et al. | |
| 2017/0120980 A1 | 5/2017 | Karl | |

FOREIGN PATENT DOCUMENTS

| | | |
|---|---|---|
| CN | 203332288 U | 12/2013 |
| CN | 203813843 U | 9/2014 |
| WO | WO 2014/14151 A1 | 9/2014 |

OTHER PUBLICATIONS

360 Degree Rotatable Cell Phone Holder for Bicycle, by VarichLotus, http://www.amazon.com/Degree-Rotatable-Phone-Holder-Bicycle/dp/B00EA1GF72/ref=sr_1_2?ie=UTF8&qid=13987134462&sr=8-2&keywords=360+Degree+Rotatable+Cell+Phone+Holder+for+Bicycle, 1996-2014, three (3) pages.

iOttie One-Touch Bike Mount Holder for iPhone 4S 4 3GS iPod Touch Samsung Galaxy S4 S3 S2 Nokia Lumina 920 HTC OneX EVO 4G Rhyme DROID RAZR MAXX Google Nexus LG Optimus G Blackberry Z10 Torch Compact Size GPS, by iOttie, http://www.amazon.com/iOttie-One-Touch-Samsung-Optimus-BlackBerry/dp/B007FHCR20, 1996-2014, six (6) pages.

Mountek nGroove Universal CD Slot Mount for Cell Phones and GPS Devices, by Mountek, http://www.amazon.com/Mountek-nGroove-Universal-Phones-Devices/dp/B004G1L52Q, 1996-2014, six (6) pages.

Delta Smart Phone Caddy, White, http://www.amazon.com/Delta-Smart-Phone-Caddy-II/do/B00A3EV372, Brand: Delta Cycle, 1996-2014, four (4) pages.

U.S. Appl. No. 15/249,621, Downes et al.

* cited by examiner

ELECTRONIC DEVICE CADDY

FIELD OF THE INVENTION

The subject invention relates to an electronic device caddy.

BACKGROUND OF THE INVENTION

There are a variety of electronic device (e.g., cell phone) caddies. Such caddies may mount to the handle bars of a bicycle. See for example, published US Patent Applications Nos. 2002/0113185 and 2005/0045681.

Various means are used to retain the electronic device in the caddy, some complex. In the applicant's prior caddy, a bungee cord biases two caddy tray portions about the electronic device securing the electronic device in the caddy. See the Delta Cycle Corp. "Smartphone Mount for Bikes" product. Sometimes, however, the cell phone was still ejected from the caddy during rough riding conditions.

SUMMARY OF THE INVENTION

In one example of the invention, a new caddy is provided which more securely retains an electronic device and yet is easy to use and enables the electronic device to be quickly and easily loaded into and removed from the caddy.

Featured is an electronic device caddy comprising a first tray portion with, for example, two spaced lengthwise channels and an end cage and a second tray portion also including an end cage and two lengthwise rails slideable in the spaced channels of the first tray portion to load and accommodate different size electronic devices between the end cages. A locking mechanism releasably locks at least one rail in its channel. A mounting bracket is attached rearward of one tray portion.

In one version, the locking mechanism includes a cam surface. The rail may include a rearward ear extending out of the channel and the locking mechanism may include a cam surface ferrule, a slot in the ferrule receiving the ear, and a lever attached to the ferrule. Preferably, the cam surface engages the first tray portion frictionally urging the rail against an inside surface of the channel when the ferrule cam surface is rotated. The channel may include a lengthwise rearward slot, the rail may include a lengthwise rearward ridge extending through the slot, and the ear may extend rearwardly from the ridge.

In some designs, the channels terminate proximate the end cage of the first tray portion. The mounting bracket may be configured as a handle bar mount. There may be one or more bungees urging the tray portions together. In one example, a bungee extends from one cage to the other cage.

Also featured us an electronic device caddy comprising a first tray portion with at least two spaced lengthwise channels and an end cage and a second tray portion also including an end cage and at least two lengthwise rails slideable in the spaced channels of the first tray portion to load and accommodate different size devices between the end cages. A earn surface locking mechanism releasably locks at least one rail in its channel. The locking mechanism is connected to the rail through the channel.

Also featured is an electronic device caddy comprising a first tray portion with at least one lengthwise channel and an end cage and a second tray portion including an end cage and at least one lengthwise rail slideable in the channel of the first tray portion to load and accommodate different size electronic devices between the end cages. A cam surface locking mechanism is attached to the rail releasably locking the rail in the channel. A mounting bracket is attached rearward of one tray portion.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features, and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
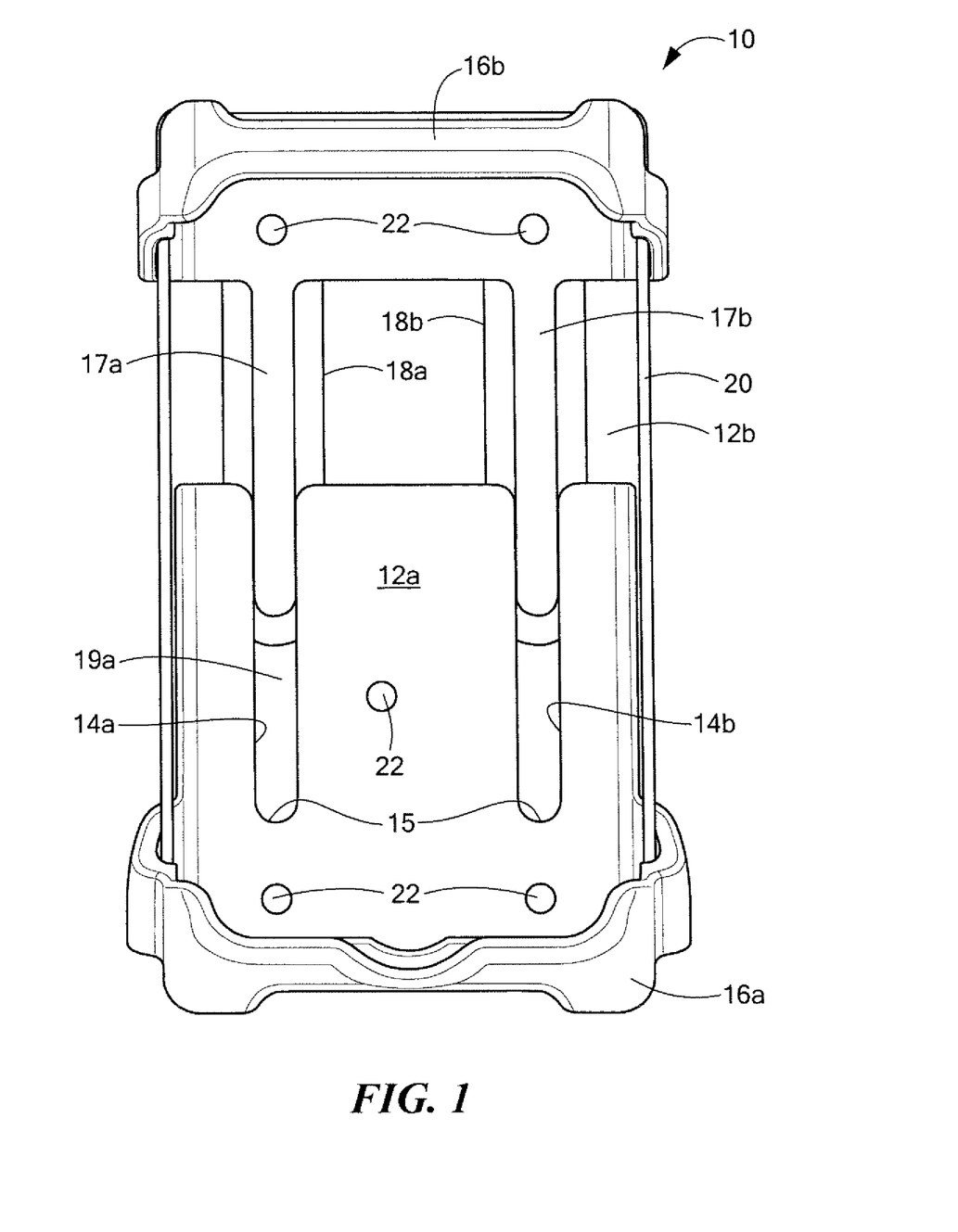
FIG. 1 is a schematic front view of an electronic device caddy in accordance with an example of the invention.

In one preferred example, electronic device caddy 10, FIG. 1 includes first tray portion 12a with one or more spaced lengthwise channels 14a and 14b and end cage 16a. Second try portion 12b includes end cage 16b and one or more lengthwise rails 18a and 18b. Rails 18a and 18b are slideably received channels 14a and 14b and thus end cage 16a can be slid towards and away from cage 16b to load and accommodate different size electronic devices. Channels 14a and 14b terminate as shown at 15 near cage 16a and each rail may include a top ridge 17a accommodated by top slot 19a in the top wall of channel 14a. The rails are typically tongue-like members, fairly flat and thin, slideably received in their respective channels between inside upper and lower channel surfaces.

The width and depth of the end cages can vary to provide caddies for different size electronic devices (e.g., cellular telephones, GPS units, tablets, mini-tablets, e-book readers, and the like).

Bungee cord 20 is typically provided to bias the two tray portions 12a, 12b closed to assist in retaining an electronic device in the caddy when inserted into end cages 16a and 16b. In this particular example, bungee cord 20 runs from the right hand side of case 16a up to and through the right hand side of cage 16b, over the top of cage 16b, back through the left hand side of cage 16b and down to a termination point at cage 16a. Elastic bumpers 22 can be placed on the front face of the tray portions as shown to cushion the rear of the electronic device.

Figure 2:
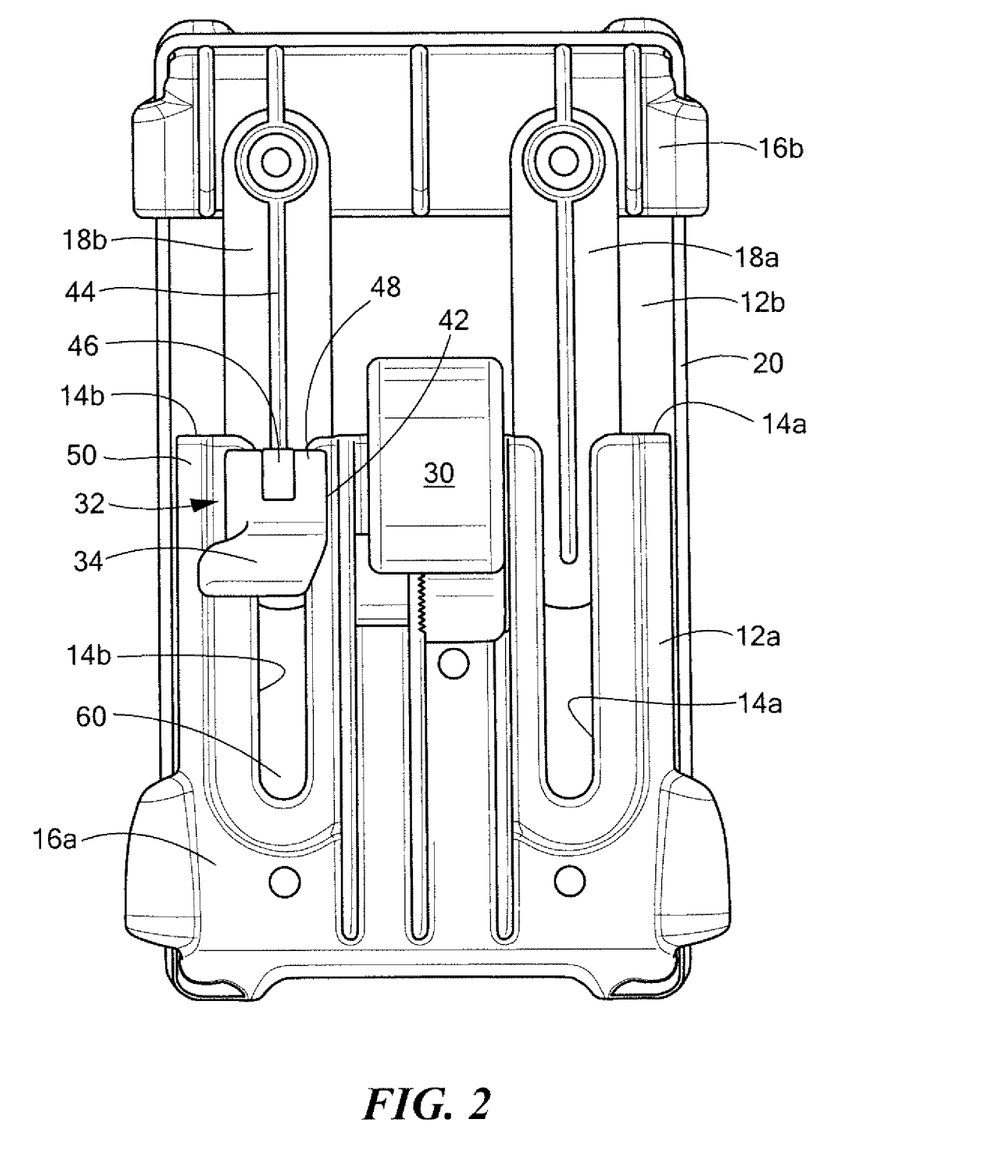
FIG. 2 is a schematic rear view of the caddy shown in FIG. 1.

FIG. 2 shows the rear of the caddy where mounting bracket 30 is used to secure the caddy to, for example, the handle bars of a bicycle, four-wheeler, or the like. Other mounting brackets can be used such as such as a mounting bracket configured to be secured to the stem of a bicycle handle bar.

Also shown is locking mechanism 32 which releasably locks rail 18b in channel 14b to more securely retain an electronic device in the caddy during rough conditions such as extreme mountain biking. Locking mechanism 32 is secured to the rail and moves with it as the tray portions are adjusted.

Figure 3:
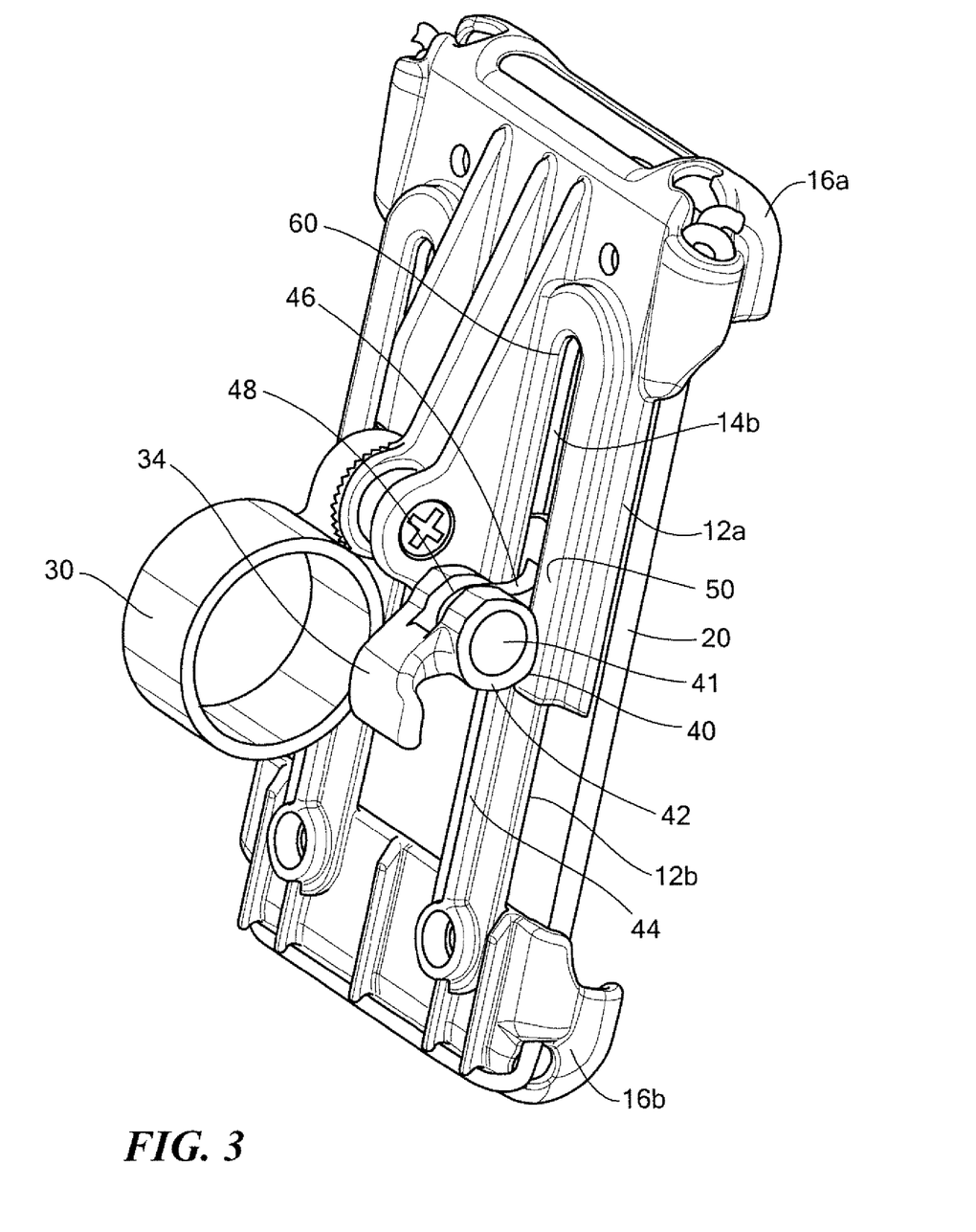
FIG. 3 is another schematic rear view of the caddy shown in FIGS. 1 and 2.
Figure 4:
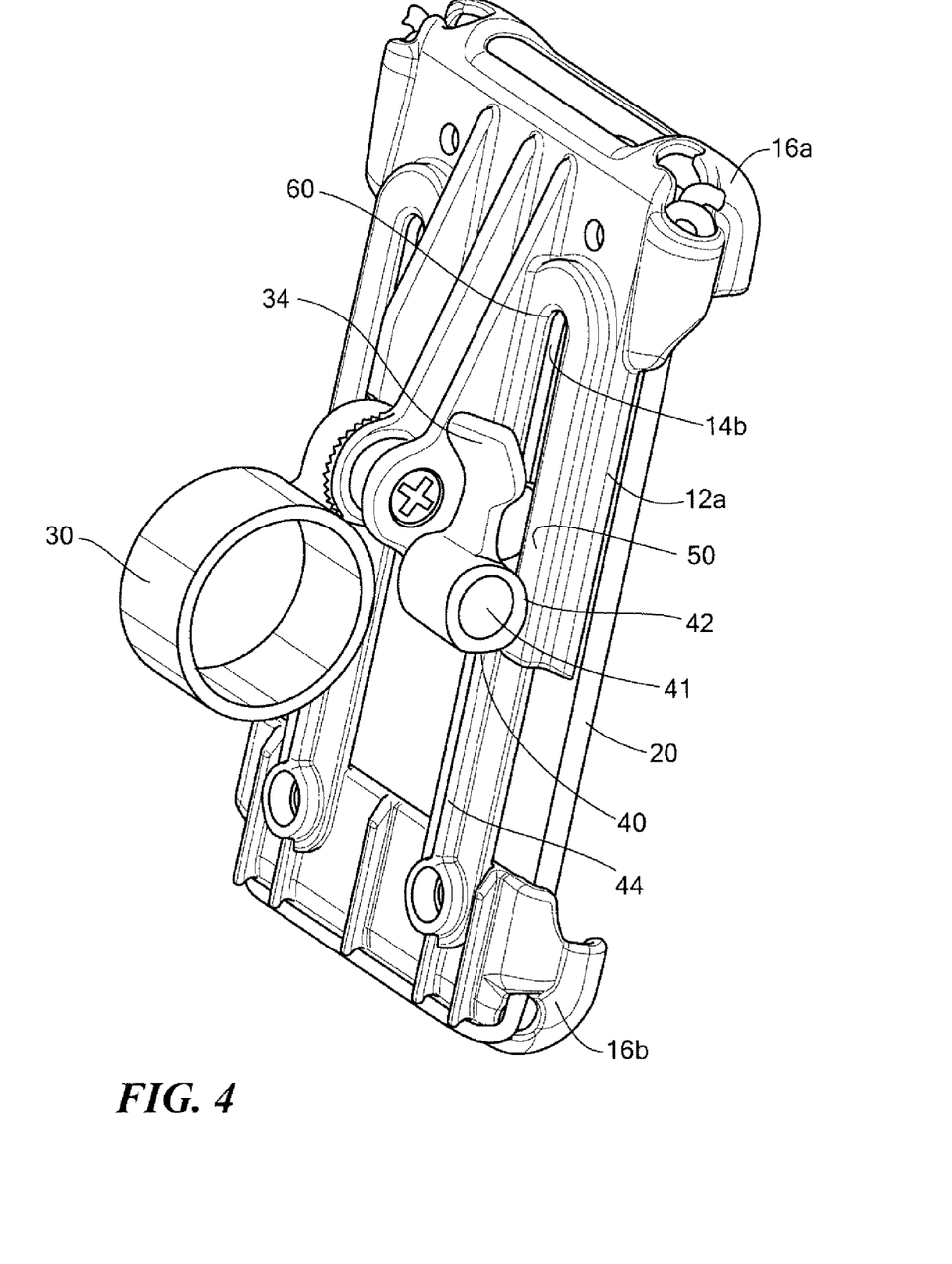
FIG. 4 is a schematic rear view showing the locking mechanism locked down.

In FIG. 3, the locking mechanism is unlocked and the end cage 16b can be moved away from end cage 16a by overcoming the spring force of bungee 20 to insert an electronic device into the caddy. Upon release, the bungee urges the end cages together and the electronic device is now fairly secure in the caddy. In FIG. 4, the locking mechanism is locked by simply pushing lever 34 down. This action locks rail 18b in channel 14b to more securely retain an electronic device in the caddy.

Figure 5:
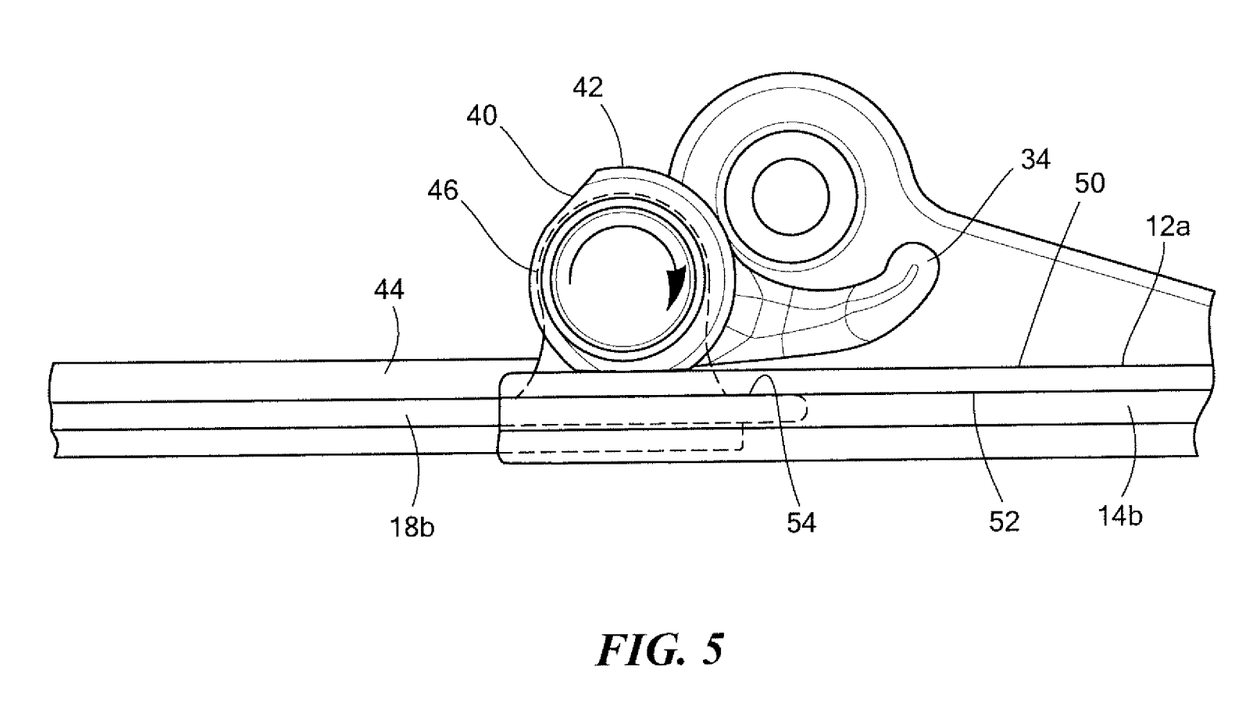
FIG. 5 is a schematic cross-sectional view of an example of a locking mechanism urging a caddy tray portion rail against an inside surface of the other tray portion channel.
Figure 6:
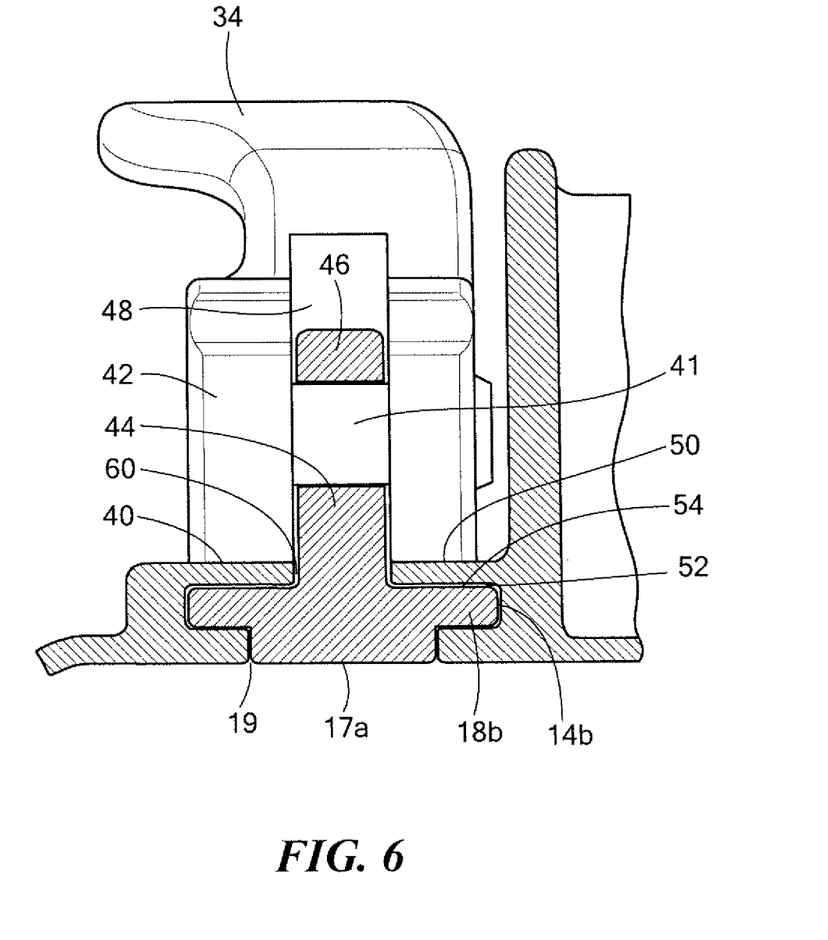
FIG. 6 is a schematic end view showing one tray portion rail inside another tray portion channel and various aspects of the locking mechanism of FIG. 5.

In this preferred embodiment, the locking mechanism includes cam surface 40 on the exterior of ferrule 42 pivotally mounted to bottom ridge 44 of rail 18b via ear 46 extending rearwardly from ridge 44 out of channel 14b. Ear 46 is pivotally received in slot 48 of ferrule 42. When rotated, the cam surface 40 engages tray 12 a rear surface 50 over channel 14b. A fastener 41 extends through the ferrule and ear. In this way, when lever 34 is moved down as shown in FIGS. 5-6 cam surface 40 (shown exaggerated) moves against rear surface 50 of the tray portion driving the ridge 44 rearward and pulling rail 18b into engagement with the inside bottom surface 52 of channel 14b so the rail bottom surface 54 is forced to maintain tight contact with the inside bottom surface 52 of channel 14b frictionally locking the rail in the channel to more securely retain the electronic device in the caddy.

To accommodate bottom rail ridge 44, FIGS. 2-6, channel 14b includes rear side slot 60. There may be a similar locking mechanism for rail 18a, FIG. 2. Other means for releasably and adjustably locking one or more rails in their respective slots may also be used. One example would be a locking mechanism which pushes the top of the rail to engage a top inside surface of the channel or which drives an edge of the rail against an inside side surface of the channel.

Figure 7:
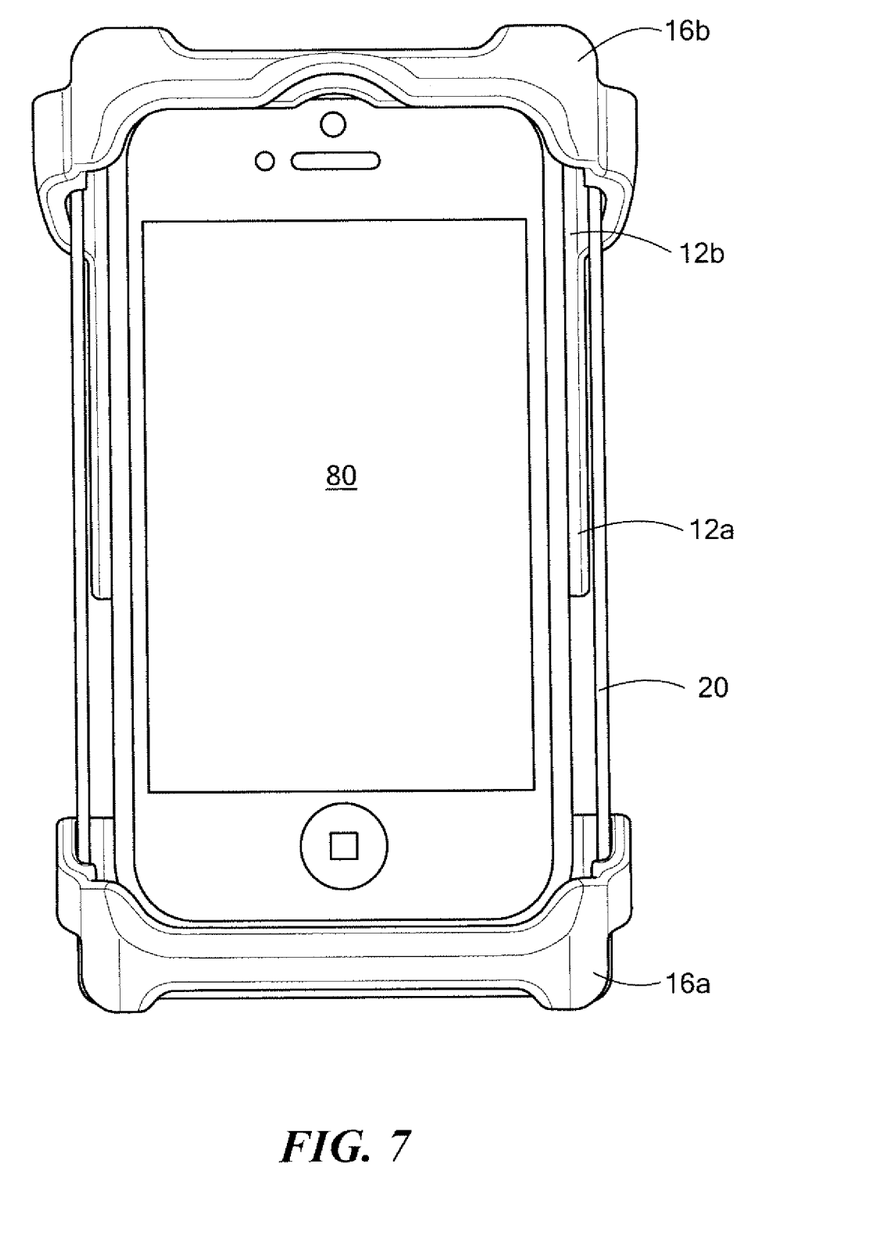
FIG. 7 is a schematic front view showing a cell phone securely retained in an example of a caddy in accordance with the invention.

FIG. 7 shows cell phone 80 secured in place in the caddy between and partially within end cages 16a and 16b locked in this position via the locking mechanism and bungee cord 20. The result in this particular design is a new caddy which more securely retains an electronic device and yet is easy to use and enables the electronic device to be quickly and easily loaded into and removed from the caddy by releasing the locking mechanism and urging the two caddy tray portions away from each other. The caddy components can be molded and can be made of plastic materials.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An electronic device caddy comprising:
   a first tray portion with one or more lengthwise channels and an end cage;
   a second tray portion including an end cage and one or more lengthwise rails including an ear extending out of a channel, each rail slideable in a channel of the first tray portion to load and accommodate different size electronic devices between the end cages;
   a bungee cord extending from one end cage and around the other end cage for urging the trays together;
   a locking mechanism including a ferrule pivotally mounted to the ear and having a cam surface for engaging the first tray portion releasably locking at least one rail in its channel by urging the rail against an inside surface of the channel; and
   a mounting bracket attached rearward of one said tray portion.

2. The caddy of claim 1 in which the locking mechanism includes a slot in the ferrule receiving said ear, and a lever attached to the ferrule.

3. The caddy of claim 2 in which said cam surface engages said first tray portion frictionally urging said rail against an inside surface of the channel when the cam surface is rotated.

4. The caddy of claim 1 in which said channel includes a lengthwise rearward slot, said rail includes a lengthwise rearward ridge extending through said slot, and said ear extends rearwardly from said ridge.

5. The caddy of claim 1 in which said channels terminate near the end cage of the first tray portion.

6. The caddy of claim 1 in which said mounting bracket is configured as a handle bar mount.

7. The caddy of claim 1 further including more than one bungee urging said tray portions together.

8. The caddy of claim 7 in which there is more than one bungee extending from one cage to the other cage.

9. An electronic device caddy comprising:
   a first tray portion with at least first and second spaced lengthwise channels and an end cage;
   a second tray portion also including an end cage and at least first and second lengthwise rails slideable respectively in the first and second channels of the first tray portion to load and accommodate different size devices between the end cages; and a cam surface locking mechanism releasably locking the first rail in the first channel, the locking mechanism connected to the first rail through the first channel urging the first rail against an inside surface of the first channel when locked.

10. The caddy of claim 9 in which first rail includes a rearward ear.

11. The caddy of claim 10 in which the locking mechanism includes a ferrule with said cam surface and a slot therein receiving said ear.

12. The caddy of claim 11 in which first channel includes a lengthwise rearward slot, said first rail includes a lengthwise rearward ridge extending through said slot, and said ear extends rearwardly from said ridge.

13. The caddy of claim 9 further including one or more bungees urging said tray portions together.

14. The caddy of claim 13 in which there is a bungee extending from one cage to the other cage.

15. An electronic device caddy comprising:

a first tray portion with at least one lengthwise channel and an end cage structured to receive an end of an electronic device;

a second tray portion including an end cage including an end cage structured to receive an opposing end of the electronic device, said second tray portion also including and at least one lengthwise rail slideable in the channel of the first tray portion to load and accommodate different size electronic devices between the end cages;

a cam surface locking mechanism attached to said rail through said channel for releasably locking said rail in said channel;

a bungee cord extending from one end cage and around the other end cage for urging the trays together and for securing the electronic device in the caddy; and a mounting bracket attached rearward of one said tray portion.

16. The caddy of claim 15 in which said rail includes an ear and the locking mechanism includes a ferrule with said cam surface, a slot therein receiving said ear, and a lever for rotating the ferrule.

17. The caddy of claim 15 in which there are two channels and two rails.

* * * * *